3,326,378
ION-EXCHANGE APPARATUS
Antoon Pieter van Mazijk, Croxley, and Reginald Dudley Ward, Uxbridge, Middlesex, England, assignors to The Permutit Company Limited, London, England, a British company
Filed Nov. 12, 1963, Ser. No. 322,845
Claims priority, application Great Britain, Nov. 16, 1962, 43,458/62
6 Claims. (Cl. 210—126)

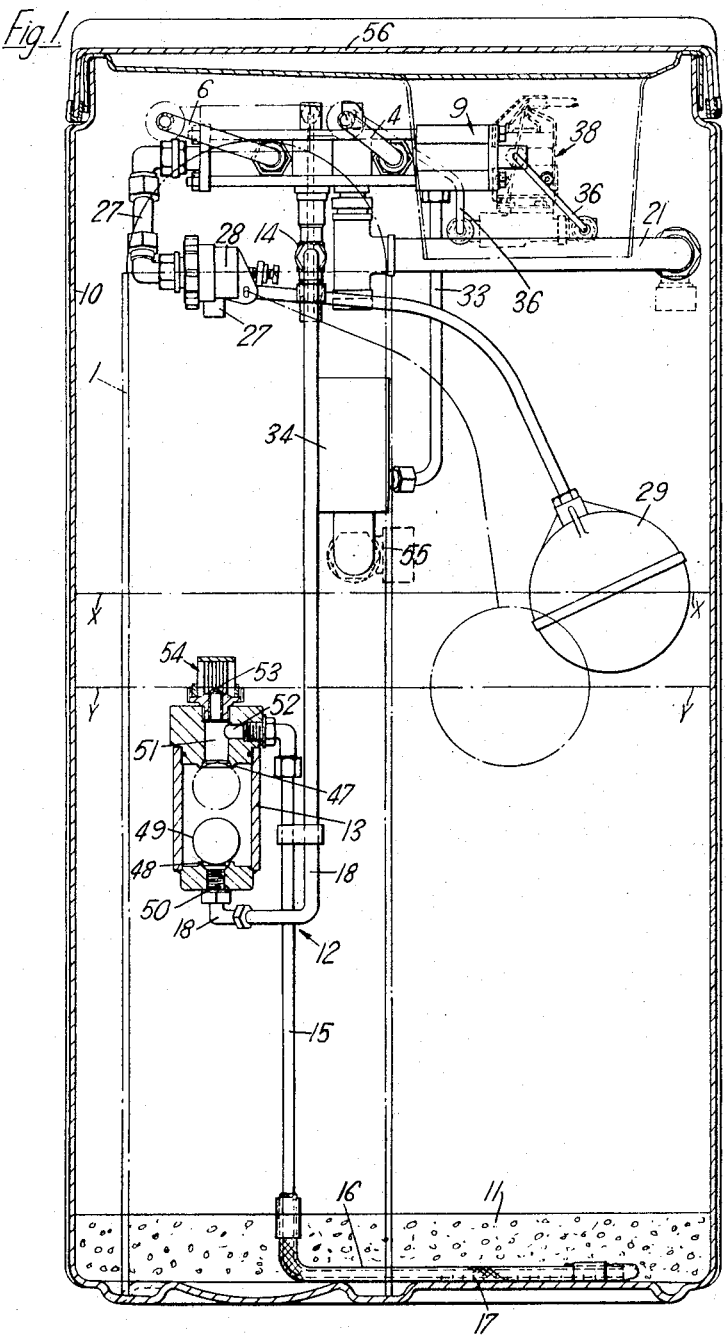

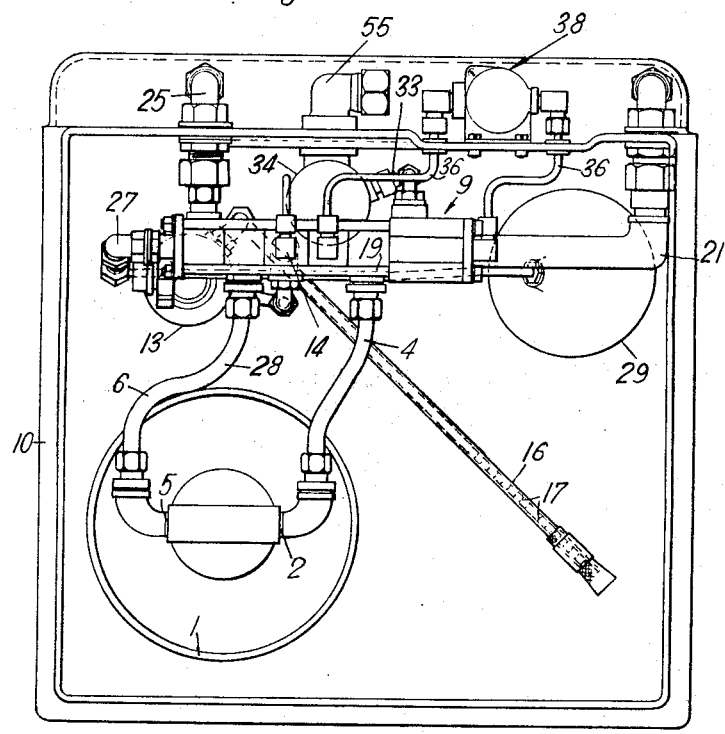

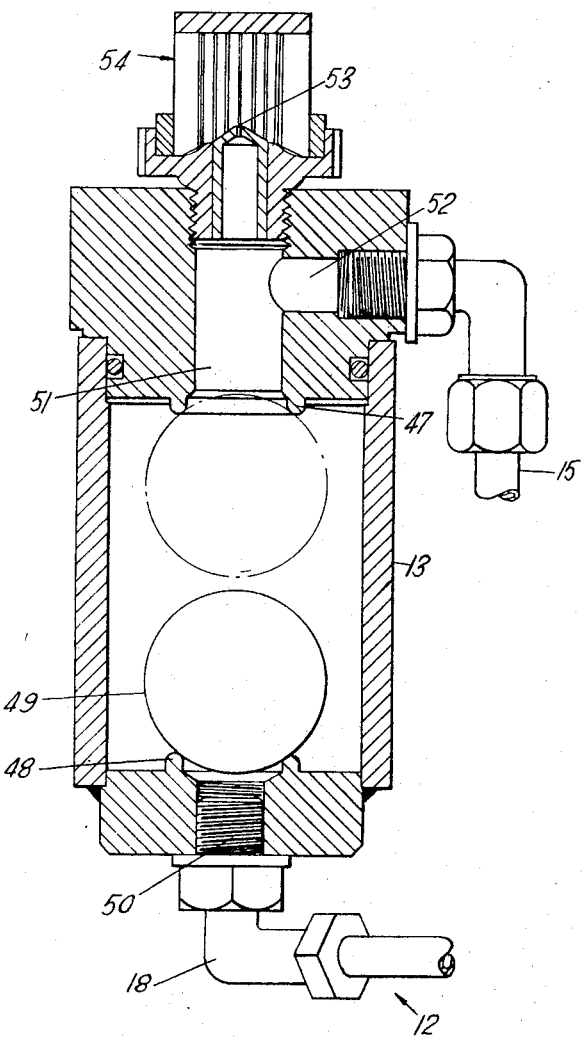

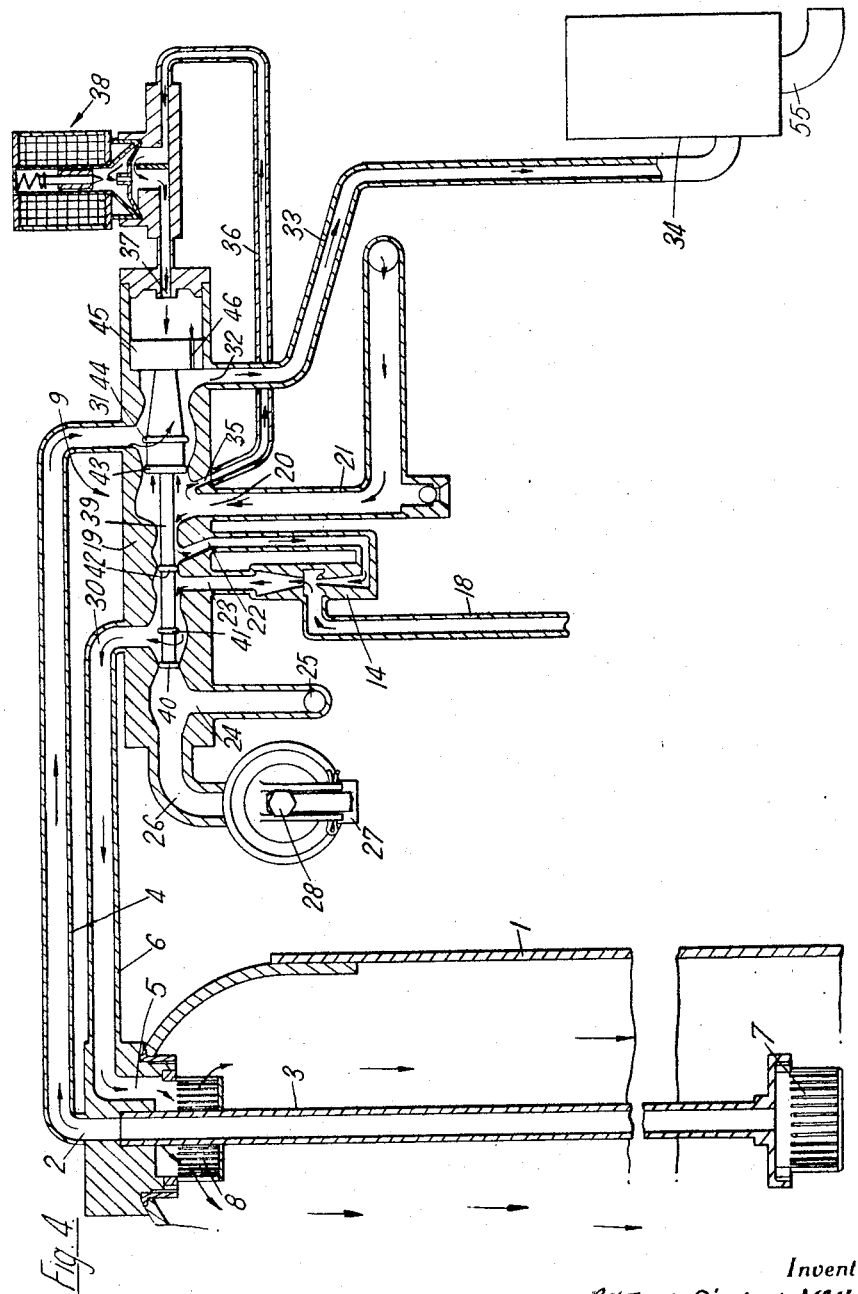

It is well known that a bed of ion-exchange material used for the treatment of liquid must be periodically regenerated. At each regeneration a definite volume of regenerant of given strength is required. In large industrial plants it is common to provide complex automatic apparatus for providing a constant volume of regenerant upon each regeneration. In smaller plants, particularly those used for softening water for domestic purposes, it is desirable that the apparatus for supplying regenerant should be very simple. One way of supplying regenerant in such plants comprises drawing the regenerant upwards through a pipe line from the bottom of a container by applying suction to the pipe line. The suction may be applied by a venturi inductor. When this method is used, there is difficulty in ensuring that the volume of regenerant delivered at each regeneration is constant.

Our object in this invention is to provide improved apparatus that includes means for applying suction to a pipe line for supplying charges of regenerant of constant volume at each regeneration from a container.

According to the invention a valve chamber having upper and lower ports respectively connected to the inlet end of the pipe line and to a source of suction is inserted in the pipe line and contains a ball which will float in the regenerant and close the lower port in the absence of regenerant. There is also a passage leading from a point at a predetermined level of regenerant in the container to the interior of the chamber. When suction is applied to the pipe line, regenerant is discharged until the predetermined level is reached, whereupon air is drawn into the chamber, the level of regenerant in it falls, and the ball closes the lower port, thus stopping the flow of regenerant from the container.

The valve chamber is preferably mounted within the container, and then the passage may most conveniently be a bleed opening in the valve chamber above the upper port. In this case the chamber is immersed in regenerant and discharge of regenerant will take place until the bleed opening is uncovered.

Provided that after each regeneration the liquid level in the container is restored to its original height, the volume of regenerant delivered at each operation will be constant. The restoration of the liquid level may be effected under the control of a conventional ball valve or other float-operated valve.

The regenerant must of course be of constant concentration as well as constant volume. The invention is particularly applicable to domestic water-softening apparatus in which the ion-exchange material is a base-exchange resin and the regenerant is common salt. This regenerant can be kept in the container, partly in the form of solid salt and partly as a saturated solution of brine, and each time a given volume of regenerant is withdrawn this volume can subsequently be replaced by an equal volume of water. In this way the size of the container of regenerant can be reduced to a minimum.

Upon completion of a regeneration cycle the ball in the valve chamber should be released from its seat against which it is held by suction. This is preferably effected by directing a flow of liquid back down the pipe line for a brief time.

Preferably, the upper port in the valve chamber also forms a seat for the ball, which then acts as a non-return valve to ensure that no liquid flows back into the container through the chamber. Such a backward flow might tend to take place if a valve controlling the flows were to stick in a wrong position, perhaps because of the presence of grit carried to it by raw water. Again, since in the regeneration step the spent regenerant is always run to a drain, there might be backward flow if the outlet of the drain were blocked by ice in very cold weather. If any such backward flow starts the ball rises in the chamber until it becomes seated on the upper seat, thus preventing flow down the pipe line.

The preferred apparatus will now be described with reference to the accompanying drawings, in which:

FIGURE 1 is a vertical section through and FIGURE 2 a plan of the apparatus;

FIGURE 3 shows the valve chamber on a larger scale; and

FIGURE 4 shows a control valve diagrammatically.

The apparatus shown is a base-exchange water softener for domestic use. It comprises a cylindrical vessel 1 made of fibreglass and housing a charge of base-exchange resin. The vessel 1 has an inlet 2 leading to an internal tube 3 through which raw water from a pipe 4 is introduced to be softened by upward flow through the resin, and an outlet 5 leading to a pipe 6 for the softened water. The tube 3 terminates in a strainer 7, and the outlet 5 is surrounded by a strainer 8. When the resin is to be regenerated, brine is introduced through the pipe 6 to flow downwardly through the resin, and the spent brine regenerant flows up the tube 3 to the pipe 4.

The flows are all controlled by a slide valve 9, which has softening and regenerating positions. In itself this valve is not part of the invention and it is therefore shown purely diagrammatically in FIGURE 4. This valve and the vessel 1 are housed with a container 10, at the bottom of which there is a layer 11 of gravel or other suitable particulate filtering material. This layer forms a support for solid salt, and the container is also charged with water. Some of the salt dissolves in the water to form a saturated solution of salt in equilibrium with the remaining solid salt. Whenever the resin has to be regenerated, a constant volume of this saturated solution must be passed through it. This charge of regenerant brine is drawn from the bottom of the container through a pipe line 12 by suction produced by a venturi inductor 14 controlled by the valve 9. A valve chamber 13 is inserted in the pipe line 12, which comprises a pipe 15 which reaches to the bottom of the container from the chamber 13, is closed at its lower end and has a section 16 lying on the bottom of the container. This section 16 has a number of fine slots 17 through which the brine may be drawn. The pipe line 12 also comprises a pipe 18 leading from the chamber 13 to the inductor 14.

The slide valve 9 comprises a body 19 formed with a port 20 for the admission of raw water from a pipe 21 which passes inwards through the wall of the container 10; a port 22 leading to the inductor 14; a port 23 through which the discharge from the inductor enters the valve body 19; a port 24 leading to a pipe 25 through which softened water flows to storage; a port 26 leading to a pipe 27 which discharges softened water into the container 10 and is controlled by a valve 28 operated by a ball 29 in accordance with the liquid level in the container 10; a port 30 to which the pipe 6 is connected; a port 31 to which the pipe 4 is connected; a port 32 from which a pipe 33 runs to discharge into a drain pot 34 which also acts as an overflow outlet and from which a drain pipe 55 runs; and a port 35 from which a pipe 36 runs to a port 37 in the end of the body 19, the pipe 36 being controlled by a solenoid valve 38.

The slide valve 9 also comprises a valve member 39 having collars 40, 41, 42, 43 and 44 which cooperate with lands in the valve body 19. The member 39 terminates in a piston 45 by which it is moved to the left as seen in FIGURE 4 when water flows through the pipe 36 on the opening of the valve 38. When the valve 38 is closed reverse movement of the valve member 19 takes place under the action of the water pressure on the collar 43, water trapped in the body 19 behind the piston 45 then flowing to drain through a passage 46 in the piston 45 and the pipe 33.

FIGURE 4 shows the valve in the regenerating position, the directions of flow being indicated by arrows. It will be seen that suction is being exerted on the pipe 18 by the inductor so that brine is flowing to the vessel 1.

The essential feature of the present invention in the apparatus shown is the provision of the valve chamber 13. This chamber is cylindrical and has upper and lower valve seats 47 and 48 concentric with the ends of the cylinder, and it contains a ball 49 that is of specific gravity slightly less than that of brine and therefore also less than that of water. Below the lower seat 48 there is a port 50 to which the pipe 18 is connected, and above the upper seat 47 there is a cylindrical space 51 in the side of which there is a port 52 connected to the pipe 15 and at the end of which there is a bleed opening 53. When suction is applied to the pipe 18 a small amount of liquid is drawn through the opening 53, but the major flow is through the pipe 15 and port 52. Since the liquid above the opening 53 may well not be a saturated solution, in contrast to that at the bottom of the container which will always be a saturated solution as long as there is solid salt in the container, it is important that the bleed opening 53 should be small.

A strainer 54 is mounted above the opening 53 to prevent solid particles fouling it, and the strainer is in turn placed immediately below the outlet of the pipe 27.

The liquid level maintained by the ball valve 28 in the container 10 is indicated at X—X. When the exact amount of saturated brine solution required at each regeneration has been delivered to the vessel 1 the liquid level in the container is that shown at Y—Y. The chamber 13 is mounted in the container 10 so that the bleed opening 53 is just above this level.

In operation, regeneration is initiated by opening the solenoid valve 38, which may be done under automatic control. Brine is then slowly drawn up to the top of the chamber 13 and flows downwards through it. The ball 49 floats in the brine in the chamber but is readily forced off the upper seat 47 to allow the brine to flow.

The level of brine falls from the level X—X until it reaches the opening 53. Air is then drawn into the chamber 13, the level of brine falls in it, and the ball 49 becomes seated on the lower seat 48. No more brine flows from the container 10, but suction is maintained while the base-exchange resin is washed with water flowing through the inductor 14.

One advantage obtained by means of the invention is that, although the suction is broken by air to stop the flow of regenerant, that air is not introduced into the pipe 15, so that there is no risk of air pockets forming in it and preventing resumption of flow.

When the solenoid valve 38 is closed again, most conveniently under time control, the slide valve 9 changes over. The passage 46 allows only slow flow, so the return of the valve from its position during regeneration to that for softening is slow, and there is a short time during the change-over when the collar 41 stops the flow of water to the pipe 6 but the collar 42 has not stopped flow to the inductor 14, so that raw water can flow out of the inductor 14 down the pipe 18. This momentary flow of water is sufficient to unseat the ball 49 from the lower seat 48 in the chamber 13.

Once the slide valve has been returned to the softening position, soft water flows into the container 10 through the pipe 27. This water splashes down onto the strainer 54, thus helping to keep the bleed opening clean. Flow of water into the container continues until the level X—X is reached, whereupon the ball valve 28 shuts off the flow. This completes the cycle of operations, which is repeated whenever regeneration is necessary.

Naturally, the quantity of solid salt in the container 10 is steadily diminished as the number of regenerations is increased, and it is necessary to recharge the container periodically. To enable this to be done, a lid 56 on the container is removed, and a charge, say, 1 cwt., of salt, is introduced. Any desired quantity of solid regenerant may be introduced, provided that the level of solid regenerant is not so high that the bleed opening 53 becomes choked.

When a large quantity of salt is charged into the container, the level of liquid in it may rise appreciably above the level X—X set by the ball valve 28, that is to say the ball 29 may become totally immersed in brine. This is an advantage in that, when the next regeneration cycle is initiated, the amount of regenerating brine drawn through the bed of base-exchange resin will be rather greater than usual. This acts as a "booster" regeneration, helping to ensure that the bed of resin does not gradually lose capacity. It is important, however, that the level of solid salt in the container should not be such as to choke the bleed opening 53.

The invention is not limited to apparatus in which the container holds solid salt and a saturated solution of salt. The container may hold a saturated solution of salt itself formed in some other container or a solution of any other regenerant of constant concentration. In such a case the bleed opening is not necessarily small. Of course, the apparatus must then also be modified so that the container is replenished with saturated regenerant instead of with soft water at the end of each regeneraion.

The invention is also not limtied to apparatus in which the valve chamber is inside the container. It may be outside the container if the passage through which air enters it is a tube running from the valve chamber into the container and having its mouth at the level to which the regenerant should fall at each regeneration. If the regenerant is of uniform concentration such a tube need not be of small diameter, but if the liquid drawn into the tube is not a saturated solution of salt or otherwise of uniform concentration the tube should allow only a small flow of liquid before its mouth is uncovered. Moreover, if such a tube is used and the valve chamber is not immersed in the regenerant, the tube may enter the valve chamber below the upper port. It should be noted, however, that if use is to be made of the ball to prevent reverse flow of liquid through the chamber, the tube must enter the valve chamber above the seat for the ball.

We claim:

1. An apparatus for supplying charges of constant volume of regenerant to an ion-exchange material comprising a container for liquid regenerant, a pipe line extending upwards from the bottom of the container, means for applying suction to the pipe line in order to withdraw a charge of regenerant from the container and deliver it to the ion-exchange material, a valve chamber connected in said pipe line, said valve chamber having upper and lower ports respectively connected to the inlet end of said pipe line and to a source of suction, the space between said ports being unobstructed and being closed except for said ports, a single ball in said valve chamber, said ball being constructed to float in water and in the regenerant and to close said lower port in the absence of regenerant and to close said upper port to prevent back flow of water or regenerant into said container from said pipe line, passage-forming means leading from a point in the container at a predetermined low level to the interior of the chamber and so constructed and arranged as to allow discharge flow of regenerant under the action of suction to take place until the regenerant in the container falls to the predetermined low level and thereupon to admit air into the chamber, permitting the ball to close the lower port and stop such discharge, and separate valve-controlled water supply means for replenishing the contents of the container to a predetermined high level after each withdrawal.

2. An apparatus as claimed in claim 1, said predetermined low level being substantially higher than the inlet end of said pipe line.

3. An apparatus for supplying charges of constant volume of regenerant to an ion-exchange material comprising a container for liquid regenerant, a pipe line extending upwards from the bottom of the container, means for applying suction to the pipe line in order to withdraw regenerant from the container and deliver it to the ion-exchange material, a valve chamber in said pipe line, said valve chamber having upper and lower ports respectively connected to the inlet end of said pipe line and to a source of suction, the space between said ports being unobstructed and being closed except for said ports, a single ball in said valve chamber, said ball being constructed to float in water and in the regenerant and to close said lower port in the absence of regenerant, and to close said upper port to prevent back flow of water or regenerant into said container from said pipe line, passage-forming means leading from a point in the container at a predetermined low level to the interior of the chamber and so constructed and arranged as to allow discharge flow of regenerant under the action of suction to take place until the regenerant in the container falls to the predetermined low level and thereupon to admit air into the chamber, permitting the ball to close the lower port and stop such discharge, said discharge-stopping means comprising a bleed opening above the upper port communicating with the interior of the container whereby with the chamber immersed in regenerant discharge of regenerant under the action of suction will take place until the bleed opening is uncovered, and separate valve-controlled water supply means for replenishing the contents of the container to a predetermined high level after each withdrawal.

4. An apparatus according to claim 3, including a valve operative to control the flows and having softening and regenerating positions, in which the source of suction is a venturi inductor controlled by the valve.

5. An apparatus according to claim 4, in which the valve is constructed to stop the flow from the inductor before stopping the flow to the inductor during the change-over from the regenerating to the softening position, whereby liquid is caused to flow backwards down the pipe line to release the ball from its seat.

6. An apparatus for supplying charges of constant volume of regenerant to an ion-exchange material comprising a container for liquid regenerant, a pipe line extending upwards from the bottom of the container, means for applying suction to the pipe line in order to withdraw regenerant from the container and deliver it to the ion-exchange material, a valve chamber in said pipe line, said valve chamber having upper and lower ports respectively connected to the inlet end of said pipe line and to a source of suction, the space between said ports being unobstructed and being closed except for said ports, a single ball in said valve chamber, said ball being constructed to float in water and in the regenerant and to close said lower port in the absence of regenerant, and to close said upper port to prevent back flow of water or regenerant into said container from said pipe line, passage-forming means leading from a point in the container at a predetermined low level to the interior of the chamber and so constructed and arranged as to allow discharge flow of regenerant under the action of suction to take place until the regenerant in the container falls to the predetermined low level and thereupon to admit air into the chamber, permitting the ball to close the lower port and stop such discharge, said discharge-stopping means comprising a bleed opening above the upper port communicating with the interior of the container whereby with the chamber immersed in regenerant discharge of regenerant under the action of suction will take place until the bleed opening is uncovered, and separate valve-controlled water supply means for replenishing the contents of the container to a predetermined high level after each withdrawal, said water-supply means including liquid-level responsive means to maintain the level of liquid in the container between upper and lower levels, the lower level being below the level of the point of communication of the bleed opening with the interior of the container.

References Cited

UNITED STATES PATENTS

| | | | |
|---|---|---|---|
| 1,865,387 | 6/1932 | Radomski | 137—399 |
| 1,866,890 | 7/1932 | Horvath | 210—128 X |
| 2,071,997 | 2/1937 | Bard | 210—140 |
| 2,695,626 | 11/1954 | Riche | 137—391 |
| 2,863,559 | 12/1958 | Schulze | 210—126 |
| 2,935,081 | 5/1960 | Kryzer | 137—391 |
| 3,089,508 | 5/1963 | Schulze et al. | |
| 3,146,788 | 9/1964 | Mahlstedt et al. | 210—191 X |
| 3,202,174 | 8/1965 | Rudelick | 137—399 |

REUBEN FRIEDMAN, *Primary Examiner.*

C. M. DITLOW, *Assistant Examiner.*